United States Patent
Kirkup et al.

(10) Patent No.: US 9,768,955 B2
(45) Date of Patent: *Sep. 19, 2017

(54) SYSTEM AND METHOD FOR EXCHANGING ENCRYPTION KEYS BETWEEN A MOBILE DEVICE AND A PERIPHERAL DEVICE

(71) Applicant: BlackBerry Limited, Waterloo (CA)

(72) Inventors: Michael Grant Kirkup, Waterloo (CA); Michael Kenneth Brown, Waterloo (CA); Michael Stephen Brown, Kitchener (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 31 days.

This patent is subject to a terminal disclaimer.

(21) Appl. No.: 14/464,005

(22) Filed: Aug. 20, 2014

(65) Prior Publication Data

US 2014/0359274 A1 Dec. 4, 2014

Related U.S. Application Data

(63) Continuation of application No. 13/192,898, filed on Jul. 28, 2011, now Pat. No. 8,855,310, which is a
(Continued)

(51) Int. Cl.
  *H04L 9/08* (2006.01)
  *H04W 12/04* (2009.01)
  (Continued)

(52) U.S. Cl.
  CPC .......... *H04L 9/0861* (2013.01); *H04L 9/0844* (2013.01); *H04W 12/04* (2013.01);
  (Continued)

(58) Field of Classification Search
  CPC .... H04W 12/04; H04L 9/0844; H04L 9/0861; H04L 63/061
  (Continued)

(56) References Cited

U.S. PATENT DOCUMENTS

| 4,200,770 A | 4/1980 | Hellman et al. |
| 5,060,263 A | 10/1991 | Bosen et al. |

(Continued)

FOREIGN PATENT DOCUMENTS

| CA | 2546388 | 11/2007 |
| CA | 2587576 | 11/2007 |

(Continued)

OTHER PUBLICATIONS

Selectsoft Publishing: "typing tutor7", 1996, XP002266910, p. 8, paragraph 1.

(Continued)

*Primary Examiner* — Abu Sholeman
(74) *Attorney, Agent, or Firm* — Integral Intellectual Property Inc.; Miriam Paton; Amy Scouten

(57) ABSTRACT

Systems and methods for providing additional security for data being transmitted across a wireless connection that has been established using a known wireless protocol (e.g. Bluetooth) are described. An encryption key is exchanged between a computing device (e.g. a mobile device) and a wireless peripheral device (e.g. a keyboard, a printer). In some embodiments, the encryption key is generated at one of the two devices. Data associated with the encryption key is output at the one device, which can be input by the user at the other device. The encryption key is then recovered at the other device from the input, thereby completing the key exchange. The encryption key can then be used to encrypt and decrypt data transmitted over the established wireless connection, providing additional security.

38 Claims, 7 Drawing Sheets

Related U.S. Application Data continuation of application No. 11/432,418, filed on May 12, 2006, now Pat. No. 8,005,223.

(51) Int. Cl.
  H04W 76/02 (2009.01)
  H04W 84/18 (2009.01)
  H04L 29/06 (2006.01)

(52) U.S. Cl.
  CPC ............ H04L 63/061 (2013.01); H04L 63/18 (2013.01); H04L 2209/80 (2013.01); H04W 76/02 (2013.01); H04W 84/18 (2013.01)

(58) Field of Classification Search
  USPC ...................... 380/27, 277; 726/1; 713/171
  See application file for complete search history.

(56) References Cited

U.S. PATENT DOCUMENTS

| | | |
|---|---|---|
| 5,363,447 A | 11/1994 | Rager et al. |
| 5,450,493 A | 9/1995 | Maher |
| 5,664,099 A | 9/1997 | Ozzie et al. |
| 6,044,470 A | 3/2000 | Kuriyama |
| 6,078,908 A | 6/2000 | Schmitz |
| 6,122,736 A | 9/2000 | Vanstone et al. |
| 6,629,245 B1 * | 9/2003 | Stone ................ G07C 9/00007 235/375 |
| 6,772,331 B1 | 8/2004 | Hind et al. |
| 6,799,517 B1 | 10/2004 | Cahill |
| 6,842,814 B1 | 1/2005 | Kim et al. |
| 6,859,535 B1 * | 2/2005 | Tatebayashi ............ G06F 21/10 380/201 |
| 6,957,342 B2 | 10/2005 | Vatanen |
| 7,013,389 B1 | 3/2006 | Srivastava et al. |
| 7,215,649 B2 | 5/2007 | Yu et al. |
| 7,224,801 B2 | 5/2007 | Abdo et al. |
| 7,379,551 B2 | 5/2008 | Chan et al. |
| 7,480,939 B1 * | 1/2009 | Nessett ................... H04L 9/083 380/247 |
| 7,496,347 B2 | 2/2009 | Puranik |
| 7,515,937 B2 | 4/2009 | Lee |
| 7,516,325 B2 | 4/2009 | Willey |
| 7,643,633 B2 | 1/2010 | Orr et al. |
| 7,813,822 B1 * | 10/2010 | Hoffberg ............ G06K 9/00369 381/73.1 |
| 7,950,026 B1 | 5/2011 | Urbach |
| 8,005,223 B2 | 8/2011 | Kirkup et al. |
| 8,185,870 B2 | 5/2012 | Burdick et al. |
| 8,269,612 B2 | 9/2012 | Horky et al. |
| 8,290,150 B2 * | 10/2012 | Erhart ..................... H04L 9/302 380/44 |
| 8,316,416 B2 | 11/2012 | Brown et al. |
| 9,396,450 B2 * | 7/2016 | Gazdzinski ............ G06Q 10/08 |
| 2002/0004784 A1 * | 1/2002 | Forbes .................. G06F 21/606 705/51 |
| 2002/0025042 A1 | 2/2002 | Saito |
| 2002/0032911 A1 | 3/2002 | Tanaka et al. |
| 2002/0080967 A1 | 6/2002 | Abdo et al. |
| 2002/0095487 A1 | 7/2002 | Day et al. |
| 2002/0122591 A1 | 9/2002 | Miller et al. |
| 2002/0129247 A1 | 9/2002 | Jablon |
| 2002/0133704 A1 | 9/2002 | Nendell et al. |
| 2002/0187808 A1 | 12/2002 | Vallstrom et al. |
| 2003/0004881 A1 | 1/2003 | Shinzaki et al. |
| 2003/0051139 A1 | 3/2003 | Kubota |
| 2003/0065918 A1 | 4/2003 | Willey |
| 2003/0099353 A1 | 5/2003 | Goh et al. |
| 2003/0103607 A1 | 6/2003 | Feakes |
| 2003/0183691 A1 | 10/2003 | Lahteenmaki et al. |
| 2003/0185398 A1 | 10/2003 | Hypponnen |
| 2003/0233550 A1 * | 12/2003 | Brickell ................ G06F 21/85 713/171 |
| 2004/0073795 A1 | 4/2004 | Jablon |
| 2004/0109567 A1 | 6/2004 | Yang et al. |
| 2004/0123160 A1 | 6/2004 | Mizrah |
| 2004/0161111 A1 | 8/2004 | Sherman |
| 2004/0187027 A1 * | 9/2004 | Chan ....................... G06F 21/10 705/51 |
| 2004/0228484 A1 | 11/2004 | Yanagisawa |
| 2005/0044425 A1 | 2/2005 | Hypponen |
| 2005/0050322 A1 | 3/2005 | Mizrah |
| 2005/0069137 A1 | 3/2005 | Landrock |
| 2005/0125673 A1 | 6/2005 | Cheng et al. |
| 2005/0152294 A1 * | 7/2005 | Yu ....................... H04M 1/7253 370/310 |
| 2005/0160479 A1 | 7/2005 | Kubota |
| 2005/0251451 A1 | 11/2005 | Tan et al. |
| 2006/0068760 A1 * | 3/2006 | Hameed ................ H04L 63/061 455/412.1 |
| 2006/0090073 A1 | 4/2006 | Steinberg et al. |
| 2006/0093138 A1 | 5/2006 | Durand et al. |
| 2006/0095941 A1 | 5/2006 | Fidler et al. |
| 2006/0105712 A1 | 5/2006 | Glass et al. |
| 2006/0109505 A1 | 5/2006 | Ha et al. |
| 2006/0116107 A1 | 6/2006 | Hulvey |
| 2006/0168264 A1 | 7/2006 | Baba et al. |
| 2006/0176281 A1 | 8/2006 | Bennett et al. |
| 2006/0178131 A1 | 8/2006 | Huotari et al. |
| 2006/0182277 A1 * | 8/2006 | Sandhu ................ H04L 9/0822 380/44 |
| 2006/0190730 A1 | 8/2006 | Iwamura |
| 2006/0221915 A1 | 10/2006 | Gatta et al. |
| 2006/0225126 A1 | 10/2006 | Brown et al. |
| 2006/0236117 A1 | 10/2006 | Lazaridis et al. |
| 2006/0291663 A1 | 12/2006 | Aissi et al. |
| 2007/0150420 A1 | 6/2007 | Iwamoto et al. |
| 2007/0226778 A1 | 9/2007 | Pietruszka |
| 2007/0266247 A1 | 11/2007 | Kirkup et al. |
| 2008/0149866 A1 * | 6/2008 | DeShazer ............... G06F 7/588 250/580 |
| 2008/0252603 A1 | 10/2008 | Dietz et al. |
| 2011/0199295 A1 | 8/2011 | Chen et al. |
| 2013/0016833 A1 | 1/2013 | Brown et al. |
| 2014/0237246 A1 | 8/2014 | Brown et al. |

FOREIGN PATENT DOCUMENTS

| | | |
|---|---|---|
| EP | 1253500 | 10/2002 |
| EP | 1710656 | 10/2006 |
| EP | 1855177 | 11/2009 |
| WO | 0072506 | 11/2000 |

OTHER PUBLICATIONS

Canadian First Office Action. Application No. 2,587,576. Dated: May 4, 2010.

European Search and Examination Report. Application No. 06113903.6. Dated: Oct. 30, 2006.

European Examination Report. Application No. 06113903.6. Dated: Jun. 11, 2008.

Amendment. Co-pending U.S. Appl. No. 11/432,414. Dated: Mar. 11, 2010.

Request for Continued Examination (RCE). Co-pending U.S. Appl. No. 11/432,414. Dated: Mar. 11, 2010.

Office Action. Co-pending U.S. Appl. No. 11/432,414. Dated: May 24, 2010.

Amendment. Co-pending U.S. Appl. No. 11/432,414. Dated: Sep. 23, 2010.

Amendment After Final. Co-pending U.S. Appl. No. 11/097,282. Dated: Dec. 7, 2009.

Advisory Action. Co-pending U.S. Appl. No. 11/097,282. Dated: Dec. 16, 2009.

Notice of Appeal. Co-pending U.S. Appl. No. 11/097,282. Dated: Apr. 6, 2010.

Amendment. Co-pending U.S. Appl. No. 11/097,282. Dated: Oct. 5, 2010.

Request for Continued Examination (RCE). Co-pending U.S. Appl. No. 11/097,282. Dated: Oct. 5, 2010.

(56) References Cited

OTHER PUBLICATIONS

Response. Co-pending U.S. Appl. No. 11/432,414. Dated: Jun. 8, 2011.
Response and RCE. Co-pending U.S. Appl. No. 11/097,282. Dated: Jun. 17, 2011.
Office Action. Co-pending U.S. Appl. No. 11/432,414. Dated: Mar. 17, 2011.
Office Action. Co-pending U.S. Appl. No. 11/097,282. Dated: Oct. 27, 2010.
Response/Amendment. Co-pending U.S. Appl. No. 11/097,282. Dated: Jan. 27, 2011.
Final Office Action. Co-pending U.S. Appl. No. 11/097,282. Dated: Feb. 17, 2011.
Final Office Action. Co-pending U.S. Appl. No. 11/432,414. Dated: Dec. 8, 2010.
Response/Amendment. Co-pending U.S. Appl. No. 11/432,414. Dated: Dec. 22, 2010.
Request for Continued Examination (RCE). Co-pending U.S. Appl. No. 11/432,414. Dated: Dec. 22, 2010.
Notice of Allowance. Canadian Application No. 2,587,576. Dated: Jan. 5, 2011.
European Communication Under Rule 71(3) EPC. Application No. 06113903.6. Dated: Feb. 11, 2009.
United States Office Action. Co-pending U.S. Appl. No. 11/432,414. Dated: Jan. 7, 2010.
Amendment. Co-pending U.S. Appl. No. 11/432,414. Dated: Sep. 17, 2009.
Amendment. Co-pending U.S. Appl. No. 11/097,282. Dated: Dec. 7, 2009.
United States Final Office Action. Co-pending U.S. Appl. No. 11/097,282. Dated: Oct. 6, 2009.
United States Office Action. Co-pending U.S. Appl. No. 11/432,414. Dated: Jun. 17, 2009.
Amendment. Co-pending U.S. Appl. No. 11/097,282. Dated: Jul. 20, 2009.
United States Office Action. Co-pending U.S. Appl. No. 11/097,282. Dated: Feb. 18, 2009.
Request for Continued Examination. Co-pending U.S. Appl. No. 11/097,282. Dated: Jan. 15, 2009.
Amendment. Co-pending U.S. Appl. No. 11/097,282. Dated: Jan. 15, 2009.
Advisory Action. Co-pending U.S. Appl. No. 11/097,282. Dated: Dec. 24, 2008.
Amendment. Co-pending U.S. Appl. No. 11/097,282. Dated: Dec. 15, 2008.
Amendment. Issued in co-pending U.S. Appl. No. 11/097,282. Dated: Aug. 1, 2008.
Final Office Action. Issued in co-pending U.S. Appl. No. 11/097,282. Dated: Oct. 17, 2008.
United States Office Action. Issued in co-pending U.S. Appl. No. 11/097,282. Dated: Apr. 2, 2008.
Co-pending U.S. Appl. No. 11/432,414, "System and Method for Exchanging Encryption Keys Between a Mobile Device and a Peripheral Output Device", filed May 12, 2006.
Co-pending U.S. Appl. No. 11/097,282, "Securely Using a Display to Exchange Information", filed Apr. 4, 2005.
Anonymous "Connecting Your Devices" 2006. Retrieved from Internet: http://bluetooth.com/bluetooth/connect/devices.
CanSec West @Stake, OllieWhitehouse Apr. 21-23, 2004 Vancouver. Retrieved from Internet: http://cansecwest.com/csw04/csw04-whitehouse.pdf.
Anonymous "Wireless Ergonomic Keyboard w/Integrated Touch Pad" 2003. Retrieved from Internet: http://www.shouldexist.org/story/2003/4/26/35326/1601.
United States Amendment After Final for U.S. Appl. No. 11/432,414, dated May 7, 2013.
United States Amendment Final Office Action for U.S. Appl. No. 11/432,414, dated Mar. 12, 2013.

Frank Stajano and Ross Anderson, The Resurecting Duckling: security Issues for Ad-hoc wireless Networks, 1999, Springerverlag Berlin Heidelbeg. p. 1-11.
David Holmes, Bluetooth developer conference, Director 3G applications AT & T wireless services, 2000, p. 1-10.
Final Office Action. Co-pending U.S. Appl. No. 11/432,414. Dated: Jul. 18, 2011.
Office Action. U.S. Appl. No. 13/616,789. Dated: Jul. 26, 2013.
Notice of Allowance. U.S. Appl. No. 11/432,414. Dated: Sep. 20, 2013.
Examiner-Initiated Interview Summary. U.S. Appl. No. 11/432,414. Dated: Sep. 20, 2013.
Hewlett-Packard "HP Business Inkjet 1200 Series Printer", Retrieved from the Internet on Oct. 8, 2013, http://h10010.www1.hp.com/wwpscmisc/vac/us/product_pdfs/411179.pdf.
KSI "Custom Products", dated May 12, 2006, retrieved from the Internet on Oct. 8, 2013, http://www.ksikeyboards.com/customprod/custom.html.
Request for Continued Examination (RCE). U.S. Appl. No. 11/432,414. Dated: Oct. 9, 2013.
United States Amendment for Co-pending U.S. Appl. No. 11/432,414, dated Nov. 1, 2012.
United States Office Action for Co-pending U.S. Appl. No. 11/432,414, dated Aug. 15, 2012.
United States Request for Continued Examination for Co-pending U.S. Appl. No. 11/432,414, dated Oct. 6, 2011.
United States Reply for Co-pending U.S. Appl. No. 11/432,414, dated Oct. 6, 2011.
United States Notice of Allowance and Examiner Initiated Interview Summary for Co-pending U.S. Appl. No. 11/097,282, dated Jun. 12, 2012.
United States Request for Continued Examination for Co-pending U.S. Appl. No. 11/097,282, dated Mar. 2, 2012.
United States Amendment for Co-pending U.S. Appl. No. 11/097,282, dated Mar. 2, 2012.
United Sates Final Office Action for Co-pending U.S. Appl. No. 11/097,282, dated Dec. 30, 2012.
United States Amendment for Co-pending U.S. Appl. No. 11/097,282, dated Dec. 10, 2011.
United States Non-Final Office Action for Co-pending U.S. Appl. No. 11/097,282, dated Sep. 21, 2011.
United States Request for Continued Examination for Co-pending U.S. Appl. No. 11/097,282, dated Jun. 17, 2011.
United States Response for Co-pending U.S. Appl. No. 11/097,282, dated Jun. 17, 2011.
United States Non-Final Office Action for Co-pending U.S. Appl. No. 11/097,282, dated Feb. 17, 2011.
Canadian Office Action for Canadian Patent Application No. 2,546,388 dated Feb. 9, 2010.
Canadian Voluntary Amendment for Canadian Patent Application No. 2,546,388 dated Nov. 4, 2010.
Co-pending U.S. Appl. No. 13/616,789, for "Securely Using a Display to Exchange Information", filed Sep. 14, 2012.
Notice of Allowance. U.S. Appl. No. 11/432,414. Dated: Dec. 5, 2013.
United States Final Office Action for U.S. Appl. No. 11/432,414, dated Jul. 18, 2011.
Canadian Notice of Allowance for Canadian Patent Application No. 2,546,388, dated Nov. 5, 2010.
Prosecution documents for U.S. Appl. No. 11/432,418 issued to U.S. Pat. No. 8,005,223.
Advisory Action for U.S. Appl. No. 11/432,414, dated May 29, 2013.
Amendment for U.S. Appl. No. 11/432,414, dated Jun. 11, 2013.
Request for Continued Examination for U.S. Appl. No. 11/432,414, dated Jun. 11, 2013.
Prosecution documents for U.S. Appl. No. 11/097,282 issued to U.S. Pat. No. 8,316,416.
United States Office Action for U.S. Appl. No. 13/192,898, dated Dec. 4, 2012.
Amendment for U.S. Appl. No. 13/192,898, dated Mar. 4, 2013.
United States Final Office Action for U.S. Appl. No. 13/192,898, dated Mar. 26, 2013.

(56) References Cited

OTHER PUBLICATIONS

Amendment for U.S. Appl. No. 13/192,898, dated May 23, 2013.
Advisory Action for U.S. Appl. No. 13/192,898, dated Jun. 7, 2013.
Request for Continued Examination (RCE) for U.S. Appl. No. 13/192,898, dated Jun. 26, 2013.
Amendment for U.S. Appl. No. 13/192,898, dated Jun. 26, 2013.
Applicant-Initiated Interview Summary for U.S. Appl. No. 13/192,898, dated Jul. 1, 2013.
Advisory Action for U.S. Appl. No. 13/192,898, dated Jul. 31, 2013.
Interview Summary for U.S. Appl. No. 13/192,898, dated Aug. 6, 2013.
United States Final Office Action for U.S. Appl. No. 13/192,898, dated Nov. 7, 2013.
Amendment for U.S. Appl. No. 13/192,898, dated Feb. 5, 2014.
Applicant-Initiated Interview Summary for U.S. Appl. No. 13/192,898, dated Feb. 7, 2014.
Examiner-Initiated Interview Summary for U.S. Appl. No. 13/192,898, dated May 15, 2014.
Notice of Allowance for U.S. Appl. No. 13/192,898, dated Jun. 2, 2014.
Interview Summary for U.S. Appl. No. 13/192,898, dated Jun. 3, 2014.
Terminal Disclaimer for U.S. Appl. No. 13/192,898, filed Mar. 4, 2013.
Terminal Disclaimer for U.S. Appl. No. 13/192,898, filed May 14, 2013.

* cited by examiner

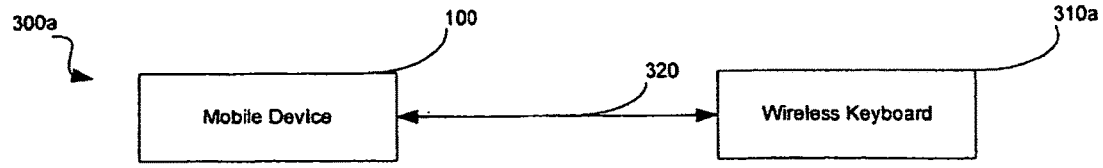
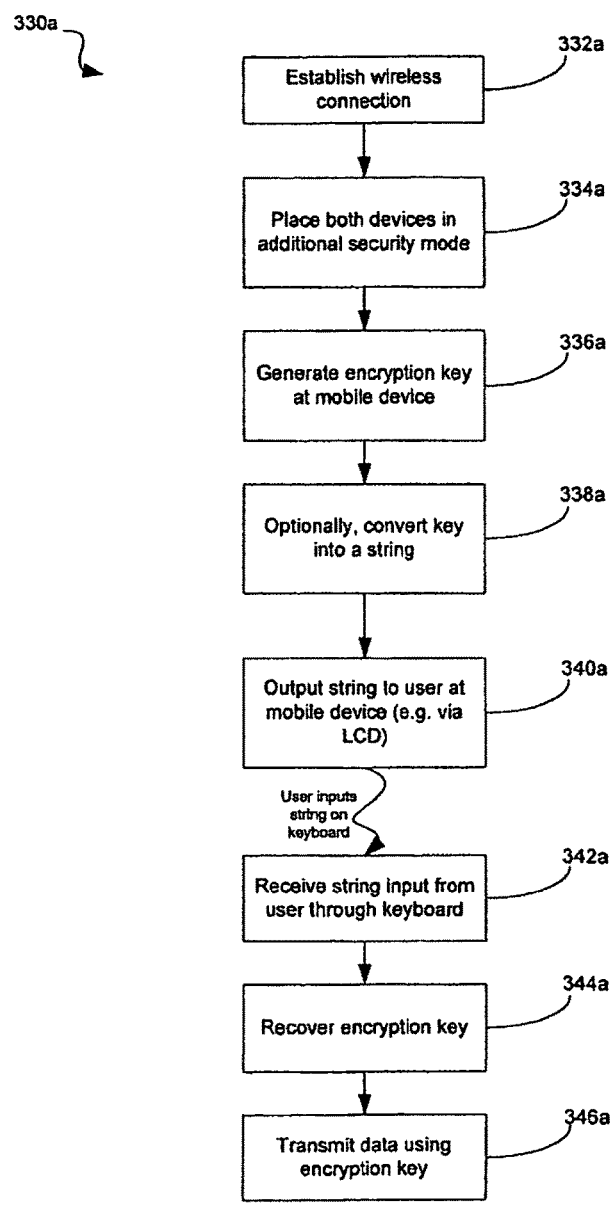

SYSTEM AND METHOD FOR EXCHANGING ENCRYPTION KEYS BETWEEN A MOBILE DEVICE AND A PERIPHERAL DEVICE

CROSS-REFERENCE TO RELATED APPLICATIONS

This application is a continuation of U.S. patent application Ser. No. 13/192,898, filed Jun. 28, 2011, which is a continuation of U.S. patent application Ser. No. 11/432,418, filed May 12, 2006. U.S. patent application Ser. No. 11/432,418 issued to patent as U.S. Pat. No. 8,005,223 on Aug. 23, 2011. The entire contents of U.S. application Ser. No. 13/192,898 and U.S. application Ser. No. 11/432,418 are hereby incorporated by reference.

RELEVANT FIELD

Embodiments of the invention relate generally to wireless peripheral devices for use with computing devices. More specifically, at least some of the embodiments described herein relate to a system and method for securely exchanging an encryption key between a wireless peripheral device and a mobile device.

BACKGROUND

Bluetooth is a known, short-range wireless technology used to connect a wide range of devices. It is a globally available standard that is, currently, widely supported. Bluetooth technology provides a number of security features, including personal identification number (PIN) authentication and the encryption of data transmitted between paired devices. After Bluetooth-capable devices identify themselves to each other, a PIN code is used the first time they connect. The PIN is a four or more digit alphanumeric code that is either fixed for or temporarily associated with a device, for the purpose of pairing with another device to which a Bluetooth wireless connection is desired.

Some experts believe that Bluetooth connections, for which security depends on the secure pairing of devices based on the PIN, are inherently insecure, particularly when the length of the PIN (e.g. typically four digits) is small. Some organizations that would require potentially sensitive data to be communicated between a mobile device and a wireless peripheral device may not consider the level of security afforded by the current Bluetooth standard alone to be sufficient.

BRIEF DESCRIPTION OF THE DRAWINGS

For a better understanding of embodiments of the systems and methods described herein, and to show more clearly how they may be carried into effect, reference will be made, by way of example, to the accompanying drawings in which:

FIG. 5A is a block diagram illustrating components of the system shown in FIG. 4A where the wireless peripheral device is a keyboard;

FIG. 5B is a flowchart illustrating steps of a method of exchanging an encryption key between the mobile device and the keyboard of the system shown in FIG. 5A;

DETAILED DESCRIPTION

Figure 1:
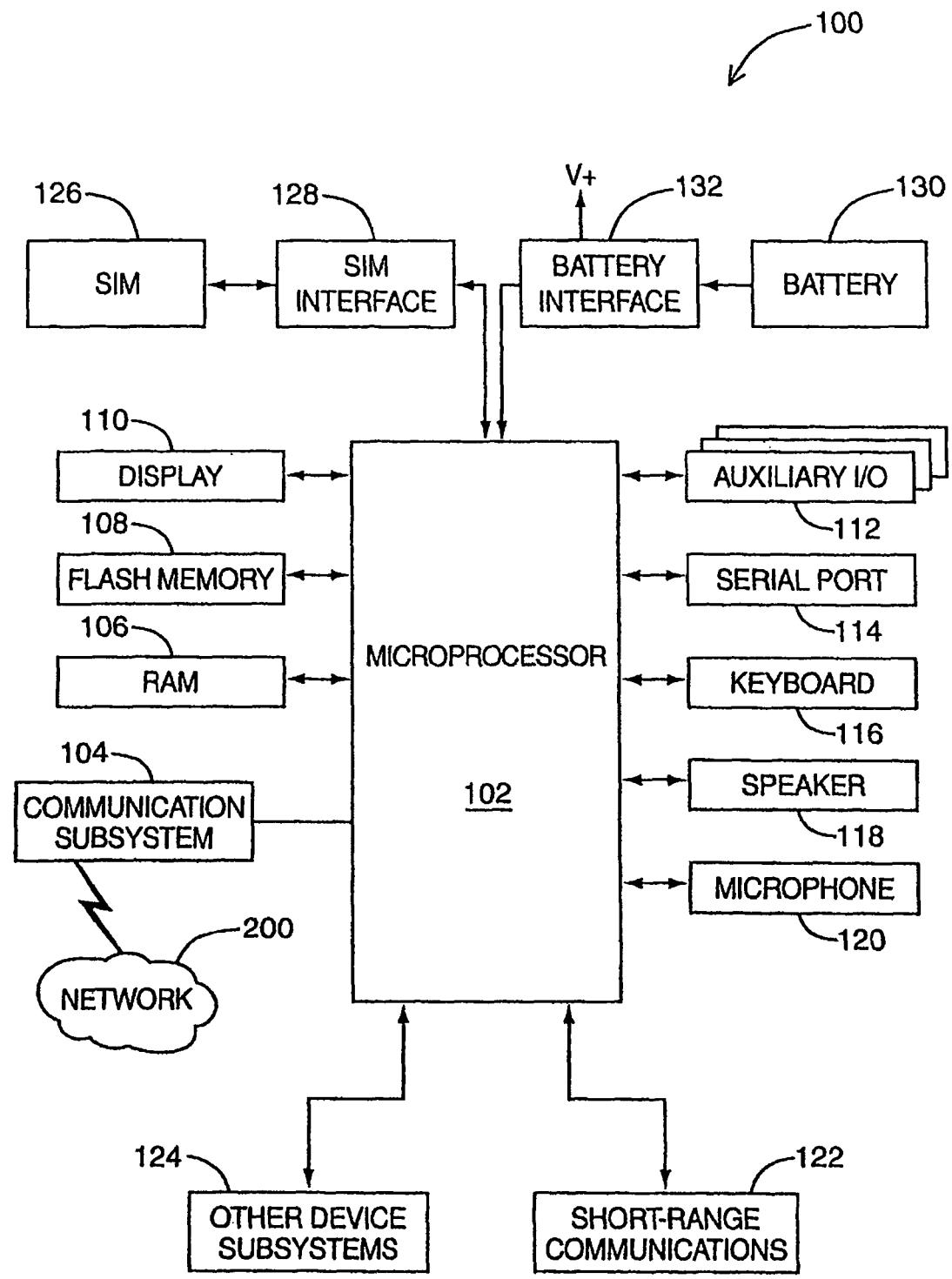
FIG. 1 is a block diagram of a mobile device in one example implementation.

Embodiments of the systems and methods described herein relate generally to wireless peripheral devices for use with computing devices, and in respect of at least one embodiment, more specifically to a system and method for securely exchanging an encryption key between a wireless peripheral device and a mobile device. The encryption key, once made available at both the wireless peripheral device and the mobile device, may be subsequently used to encrypt and/or decrypt data transmitted between the two devices.

In one broad aspect, there is provided a method of exchanging an encryption key between a computing device and a wireless peripheral device, the method comprising the steps of: generating an encryption key at one of the computing device and the peripheral device; outputting data associated with the encryption key to a user at the one device; receiving the data associated with the encryption key input by the user at the other of the computing device and the peripheral device; recovering the encryption key at the other device from the data associated with the encryption key input by the user; and transmitting data encrypted with the encryption key over a wireless connection between the computing device and the peripheral device, the wireless connection established in accordance with a wireless protocol; wherein the data associated with the encryption key is non-derivable from the data transmitted between the computing device and the peripheral device at the transmitting step.

In another broad aspect, there is provided a method of exchanging an encryption key between a computing device and a wireless keyboard, the method comprising the steps of: generating an encryption key at the computing device; outputting data associated with the encryption key to a user at the computing device; receiving the data associated with the encryption key input by the user at the keyboard; recovering the encryption key at the keyboard from the data associated with the encryption key input by the user; and transmitting data encrypted with the encryption key over a wireless connection between the computing device and the keyboard, the wireless connection established in accordance with a wireless protocol; wherein the data associated with the encryption key is non-derivable from the data transmitted between the computing device and the peripheral device at the transmitting step.

In another broad aspect, there is provided a method of exchanging an encryption key between a computing device and a wireless printer, the method comprising the steps of: generating an encryption key at the printer; outputting data associated with the encryption key to a user at the printer;

receiving the data associated with the encryption key input by the user at the computing device; recovering the encryption key at the computing device from the data associated with the encryption key input by the user; and transmitting data encrypted with the encryption key over a wireless connection between the computing device and the printer, the wireless connection established in accordance with a wireless protocol; wherein the data associated with the encryption key is non-derivable from the data transmitted between the computing device and the peripheral device at the transmitting step.

In exemplary embodiments, the computing device is a mobile device.

Features of these and other aspects, and of a number of embodiments of systems and methods are described below.

The description of some embodiments of the systems and methods described herein make reference to a mobile device, also known in the art as a mobile station. A mobile device is a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 2:
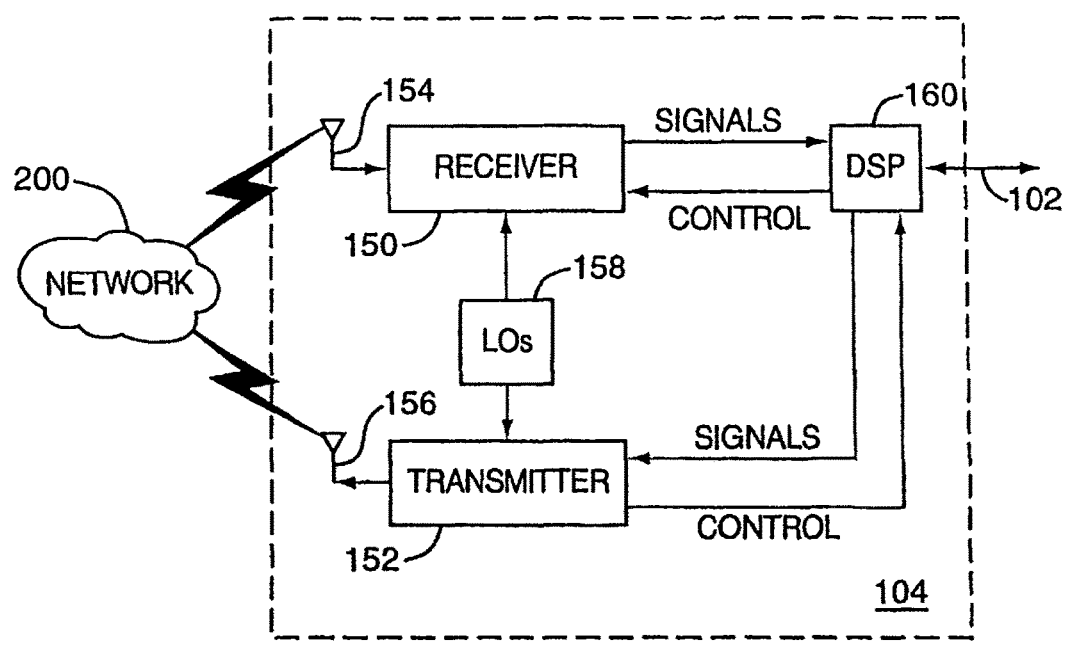
FIG. 2 is a block diagram of a communication subsystem component of the mobile device of FIG. 1.
Figure 3:
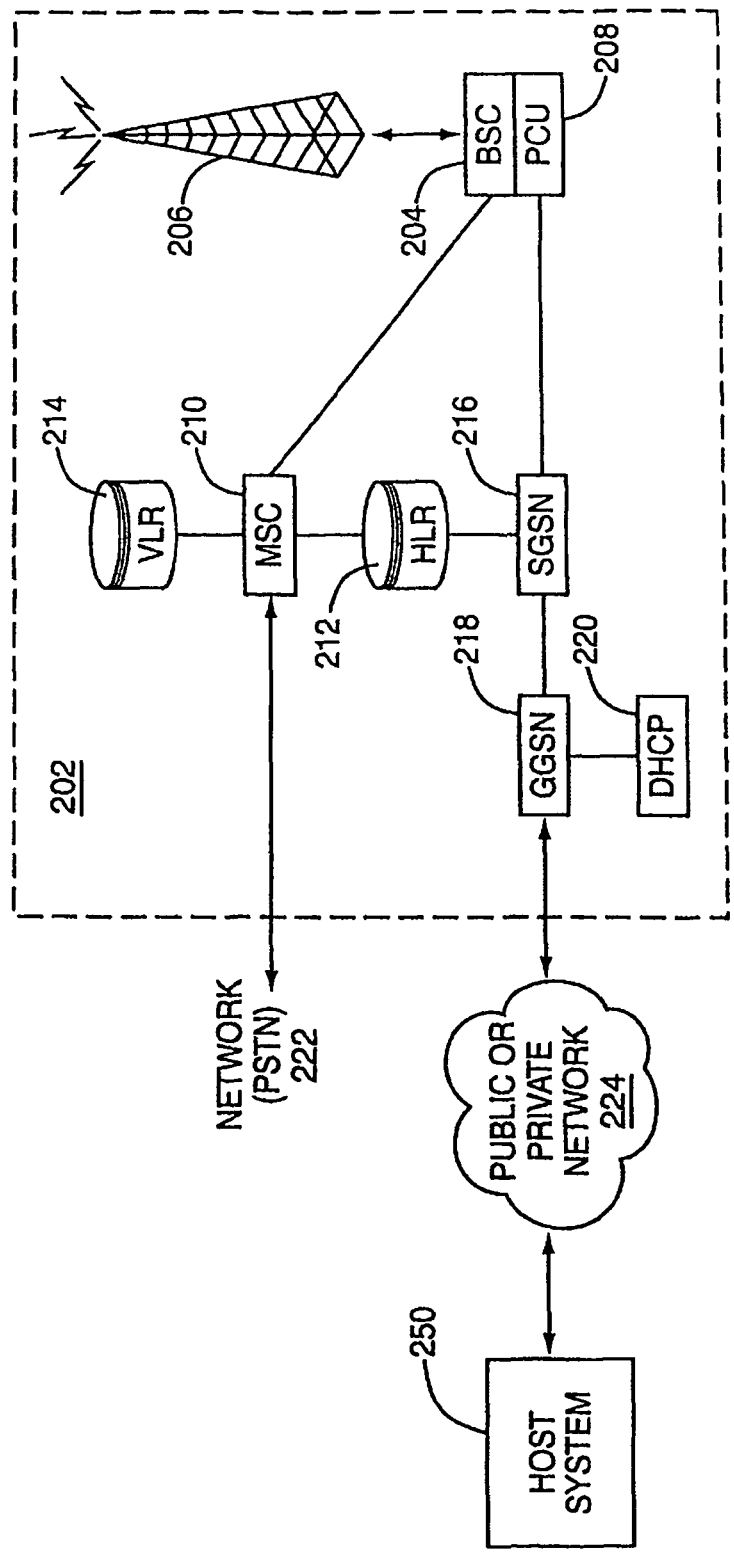
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Other network communication technologies that may be employed include, for example, Integrated Digital Enhanced Network (iDEN™), Evolution-Data Optimized (EV-DO), and High Speed Downlink Packet Access (HSDPA).

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound to any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, short-range communication subsystem 122 may include an infrared device and associated circuits and components for short-range communication. The short-range communication subsystem 122 can be used to communicate with a Wireless Personal Area network (WPAN). In some cases, the short-range communications subsystem 122 can comprise a Bluetooth radio, a ZigBee device, a Wireless USB (WUSB) device, and/or an Ultra-Wideband (UWB) radio, for example. Examples of short range communication standards include standards developed by the Infrared Data Association (IrDA), Bluetooth, ZigBee, WUSB, UWB, and the 802.11 and 802.15 families of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (ND) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time require less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

At least some of the embodiments described herein are directed to a system and method for securely exchanging an encryption key between a wireless peripheral device and a mobile device.

Some experts believe that connections between Bluetooth devices, of which security depends on the secure pairing of the devices based on a PIN, are inherently insecure, particularly where the length of the PIN (e.g. typically four digits) is small. Furthermore, security may also be compromised if the pairing process is not performed in private.

Accordingly, in at least one embodiment, means for providing additional security for data being transmitted across a wireless connection that has been established using a known wireless protocol (e.g. Bluetooth) is described herein. More specifically, embodiments of a system and method for exchanging an encryption key between a mobile device and a wireless peripheral device are described herein, where the encryption key can be subsequently used to encrypt and/or decrypt data transmitted between the two devices across the established wireless connection.

In these embodiments, the encryption key that is exchanged between the mobile device and the wireless peripheral device is unrelated to (i.e. not derivable from) any PIN that may be used to pair two (e.g. Bluetooth-enabled) devices, for example. This provides additional security, as a brute force recovery of the PIN would not aid any malicious attempt to uncover the exchanged encryption key, which could then be used to decrypt potentially sensitive data that is transmitted between the two devices.

Furthermore, the security associated with the subsequent use of an exchanged encryption key is provided in addition to any security that is inherent in the underlying established wireless connection. For example, depending on the security mode for Bluetooth access that has been enabled between two devices, data being transmitted across a Bluetooth connection between the two devices can be encrypted as the Bluetooth standard provides for data encryption capability. However, the additional security afforded by the use of the encryption key exchanged in accordance with an embodiment described herein would be provided to data transmitted over the Bluetooth connection, whether the built-in Bluetooth data encryption capability has been enabled or not.

By allowing additional security to be introduced in a manner that is independent of the protocol used to establish the underlying (e.g. Bluetooth) wireless connection, greater flexibility may be provided. For example, it may be easier to modify existing devices that are already capable of establishing wireless connections in accordance with a known protocol, in order to provide the additional security. As a further example, once two devices are paired or otherwise connected, new encryption keys that may be used to provide the additional security can generally be exchanged at any desired time, and at any desired frequency, between the devices.

In exemplary embodiments, the encryption key used to provide additional security is a key that is used to encrypt and decrypt data in accordance with a symmetric encryption technique, such as the Advanced Encryption Standard (AES), Data Encryption Standard (DES), or Triple DES (3DES), for example. In order for both the mobile device and the wireless peripheral device to be capable of encrypting and decrypting the data that each device is to transmit to the other over the established (e.g. Bluetooth) wireless connection, there is a need for a secure means to exchange the encryption key to be used between the two devices.

It will be understood by persons skilled in the art that the act of exchanging an encryption key need not involve the transmission of the actual encryption key itself from one device to the other. It will also be understood that it is not necessary that an actual encryption key be initially generated at only one device and then subsequently transferred to the other device in order to constitute an "exchange". It is sufficient that the encryption key to be used is derived at or otherwise becomes known to each device, through the processing of some data that is shared between the two devices. In that case, a key "exchange" is deemed to have occurred.

Figure 4A:
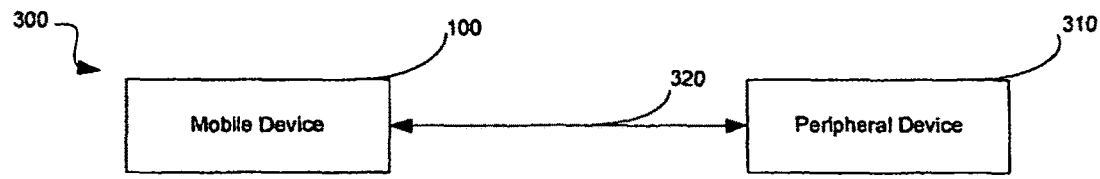
FIG. 4A is a block diagram illustrating components of a system comprising a mobile device and a wireless peripheral device for use therewith.
Figure 4B:
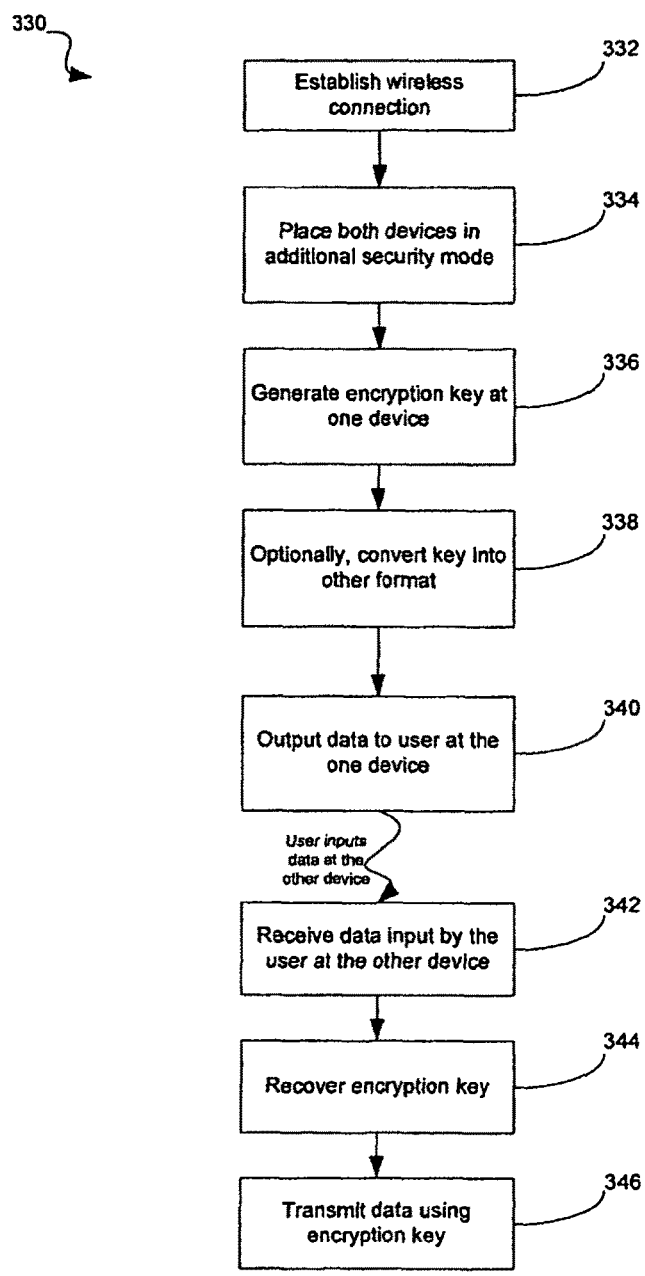
FIG. 4B is a flowchart illustrating steps of a method of exchanging an encryption key between the mobile device and the wireless peripheral device of the system shown in FIG. 4A.

Referring to FIGS. 4A and 4B, a block diagram illustrating components of a system comprising a mobile device and a wireless peripheral device for use therewith, and a flowchart illustrating steps of a method of exchanging an encryption key between the mobile device and the wireless peripheral device, in at least one embodiment, are shown generally as 300 and 330 respectively.

In FIG. 4A, a system 300 comprising a mobile device 100 coupled to a peripheral device 310 via a wireless connection 320 is shown. In exemplary embodiments, mobile device 100 comprises a short-range communications subsystem (e.g. 122 of FIG. 1) to facilitate wireless communication with peripheral device 310 over wireless connection 320. Wireless connection 320 may be a Bluetooth connection, for example.

In one embodiment, peripheral device 310 is a device that provides keyboard or keypad input capabilities, as described in greater detail below with reference to FIGS. 5A and 5B. In another embodiment, peripheral device 310 is a device that provides printing capabilities, as described in greater detail below with reference to FIGS. 6A and 6B. In variant embodiments, peripheral device 310 will be some other device with either input and/or output capabilities.

Referring now to FIG. 4B, method 330 commences with the establishment of the wireless connection 320 between the mobile device 100 and the peripheral device 310 in accordance with a known wireless protocol (e.g. Bluetooth), at step 332.

If wireless connection 320 is a Bluetooth connection, step 332 may comprise configuring both devices so that they are made visible for pairing, placing both devices into a pairing mode, and completing a pairing process in known manner. In the pairing process, a PIN code generated by one device or otherwise fixedly associated with the one device is entered into the other device via a user interface, and the two devices subsequently validate each other.

In exemplary embodiments, a software application that executes on mobile device 100 (e.g. by microprocessor 102 of FIG. 1) is programmed to perform at least a first subset of the steps of method 330, and a software application that executes on peripheral device 310 (e.g. as firmware of peripheral device 310) is programmed to perform at least a second subset of the steps of method 330. In variant embodiments, the instructions to perform some or all of the steps of method 330 may be embedded in hardware.

At step 334, both the mobile device 100 and the peripheral device 310 are placed into an "additional security" operational mode, which indicates that data transmissions are to be encrypted with an encryption key that is to be exchanged between the two devices as described herein.

Mobile device 100 may be placed into the additional security operational mode, for example, in response to a user request (e.g. the user manually selects a corresponding configuration option at the mobile device 100), automatically after pairing has been completed at step 332, or automatically in accordance with a pre-defined schedule. The manner in which mobile device 100 can be placed into the additional security operational mode may be reflected in configuration settings on mobile device 100. In variant embodiments, the values of the configuration settings may be set in accordance with a security policy ("IT Policy") governing the use of mobile device 100.

Similarly, peripheral device 310 may be placed into the additional security operational mode, for example, in response to a user request (e.g. the user manually operates a button on the peripheral device in a pre-specified manner), automatically after pairing has been completed at step 332, or automatically in accordance with a pre-defined schedule.

Placing both devices into the additional security operational mode may require that action be independently taken at each device. Alternatively, a first of two devices may be placed into the additional security operational mode (either automatically or in response to user input), which subsequently triggers the transmission of a command to the second of the two devices over the wireless connection 320. In the latter case, placement of the second device into the additional security operational mode is performed automatically upon receipt of the command at the second device from the first device.

At step 336, an encryption key is generated at one of the mobile device 100 and the peripheral device 310, in accordance with a key-generating algorithm. For example, the key-generating algorithm may produce a random 128-bit, 196-bit, or 256-bit number. The one device at which the encryption key is generated at this step needs to be capable of providing output to a user, while the other of the two devices must be capable of receiving input from the user. The generated encryption key is then typically stored at the one device [step not explicitly shown].

Optionally, at step 338, the encryption key generated at step 338 is converted into new data, preferably in a more user-friendly format, using a key-conversion algorithm. The key-conversion algorithm that is used must allow the encryption key to be recoverable from the new data (with possibly some other data). Therefore, for example, a hashing function would generally be inappropriate for performing the conversion at this step.

The format that may be employed for the new data may depend on the input capabilities of the other of the mobile device 100 and the peripheral device 310. For instance, an encryption key may be converted into a shorter alphanumeric string, if the other device is capable of receiving such strings as input.

In one embodiment, the key-conversion algorithm simply converts a binary key into a hexadecimal number, and produces the hexadecimal number as the string, for example.

At step 340, data is output to a user at the one device where the encryption key was generated at step 336. Where step 338 is not performed, the data output at step 340 might comprise the actual encryption key. However, more typically, the data output at step 340 will comprise the new data generated from the conversion of the encryption key as performed at step 338.

The data output to the user at step 340 might be, for example, shown in a display (e.g. a liquid crystal display (LCD)), written to a physical medium (e.g. paper, disk), provided in an audio format (e.g. peripheral device 310 may be a headset or speaker, and the headset or speaker could further convert a string or number into speech to be output to the user), or presented on a touch-based device (e.g. Braille pad). Additional instructions and other information to be considered by the user may also be provided with the data that is output at this step.

In operation, after the data is output to a user at step 340 at one of the mobile device 100 and the peripheral device 310, the user will input the data at the other of the two devices, via a user interface provided at the other device. The data is not transmitted over the wireless connection 320.

The data input by the user is received at the other device, as shown at step 342. For example, step 342 may comprise receiving an alphanumeric string that was generated by conversion at step 338, as user input.

At step 344, the encryption key (originally generated at step 336) is recovered at the device receiving the data input at step 342, and subsequently stored at that device [storing step not explicitly shown]. This may require the application of an appropriate key recovery technique associated with the key-conversion algorithm employed at step 338, if step 338 was performed. Depending on the key-conversion algorithm being employed, recovering the encryption key may also require processing other data (e.g. which may be pre-stored or otherwise provided to the device) in addition to the data received from the user at step 342.

Accordingly, after step 344 is performed, the encryption key is available at both mobile device 100 and peripheral device 310. Completion of steps 336 to 344 constitutes a secure exchange of the encryption key between the two devices.

With the encryption key now available at both devices, data may be transmitted between the devices as shown at step 346, where the transmissions are encrypted using the encryption key in accordance with a data encryption algorithm (e.g. AES, DES, 3DES). Transmitted data received by a device can then be subsequently decrypted using the same encryption key [step not explicitly shown].

The out-of-band exchange of data output at one device with the other device will prevent hackers who surreptitiously monitor wireless communications from intercepting the data over the wireless connection and recovering the encryption key.

In view of the additional security provided by embodiments of method 330, it will be understood that in respect of Bluetooth connections, even if a hacker were able to pair with one of two Bluetooth devices and masquerade as the other device, the hacker would not have access to the encryption key necessary to decrypt the transmissions it receives. Moreover, the encryption key exchanged in accordance with embodiments described herein could not be derived from a PIN even if the hacker manages to uncover the PIN. Furthermore, unlike a PIN used to pair Bluetooth devices that might be maliciously uncovered by the hacker (particularly when the length of the PIN is small), there is no data that is exchanged over the established wireless connection 320 when encrypted with an encryption key of sufficient length, that could effectively be used to derive the data output at step 340 at one device to be shared out-of-band with the other device. Effectively, the data output at step 340 is non-derivable from the encrypted data transmitted between the two devices. The data output at step 340 is used to derive the encryption key, and not for the purposes of pairing two devices. Accordingly, additional security is provided.

It will be understood by persons skilled in the art that some of the steps of method 330 may be repeated. For example, new keys may be exchanged between the two devices (e.g. by repeating steps 336 to 344) in accordance with a pre-defined schedule, at a certain frequency, or as otherwise desired, automatically and/or in response to a user request. This flexibility may provide additional security without requiring a new wireless connection to be established or a pairing process to be repeated.

Furthermore, in variant embodiments, the same data may be output at one device (at step 340) to be input by a user at multiple other devices. The same encryption key may be recovered from this data at each of the devices sharing the data, and used to encrypt and decrypt data transmitted between any subset of these devices when connected, if desired.

Figure 6A:
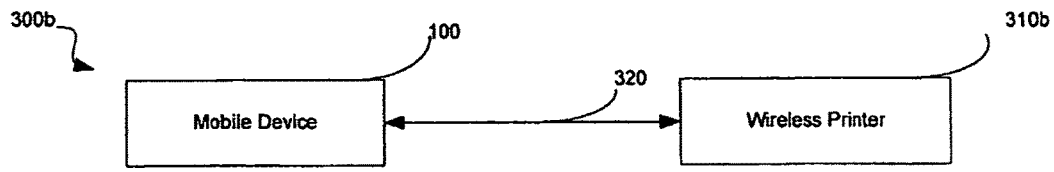
FIG. 6A is a block diagram illustrating components of the system shown in FIG. 4A where the wireless peripheral device is a printer.

Details of embodiments of method 330 have been provided above with reference to a mobile device and a general peripheral device. Additional details of the method will now be provided in the description of FIGS. 5B and 6B that follows, where the peripheral device is more specifically a wireless keyboard 310*a* as shown in FIG. 5A, and where the peripheral device is more specifically a peripheral output device such as a wireless printer 310*b* as shown in FIG. 6A respectively. It will be understood, however, that method 330 may be implemented in respect of other peripheral devices in variant embodiments.

For example, in one variant embodiment, peripheral device 310 may be a headset, and data is output to the user at step 340 at the headset (e.g. either as audio/speech or via a display on the headset) to be entered by the user on the mobile device, received by the mobile device at step 342.

It will be understood that there may be particular benefits associated with embodiments where the data is output (at step 340) at the peripheral device, and the data is input at the mobile device (received at step 342). In these embodiments, the data to be shared is first generated at the peripheral device, and not at the mobile device. In the past, prior art peripheral output devices were not adapted to perform tasks related to generating data associated with encryption keys. This may be attributed to the fact that the peripheral devices are generally not expected to perform such processing tasks. Furthermore, peripheral devices capable of outputting data to a user (e.g. printers, headsets) are often considered to be passive devices compared to the mobile device or other computing device to which they may be connected.

Accordingly, greater flexibility may be provided where the data output at step 340 is output at the peripheral device. For example, some of the processing tasks required in the exchange of encryption keys are diverted to the peripheral device, potentially conserving resources at the computing device connected to the peripheral device, which may be particularly beneficial when the computing device is a mobile device. Furthermore, the user may receive the output data from the peripheral device and enter it into the mobile device or other computing device, prior to when additional security is desired, at the convenience of the user. This may, for instance, permit more efficient configuration of a system in which keys are to be exchanged between multiple peripheral devices and the mobile device or other computing device.

Referring to FIG. 5B, a flowchart illustrating steps of a method of exchanging an encryption key between the mobile device and the keyboard of the system shown in FIG. 5A is shown generally as 330*a*. Steps 332*a* to 346*a* generally correspond to steps 332 to 346 as described with reference to FIG. 4B, except that the peripheral device is more specifically a wireless keyboard 310*a*. Accordingly, the reader is directed to the description provided herein with reference to FIGS. 4A and 4B for details in respect of method 330*a*.

In one example embodiment as shown in FIG. 5B, the encryption key is generated at mobile device 100 (step 336*a*), which is converted to a string (step 338*a*). Conversion of the key into a string format may be considered particularly appropriate for this specific peripheral device, since a keyboard is naturally designed to accept alphanumeric input. The string is then output to a user of mobile device 100 (step 340*a*) through a display (e.g. 110 of FIG. 1) of mobile device 100.

In operation, the user types the string that is output at the mobile device 100 into wireless keyboard 310*a*.

Once the keys are pressed on wireless keyboard 310*a*, the characters received from the user through the keyboard are converted into a string (step 342*a*), which is then used to recover the encryption key (step 344*a*). The encryption key can then be used to encrypt and decrypt data transmitted between mobile device 100 and wireless keyboard 310*a*, in accordance with a data encryption algorithm.

Accordingly, security can be added to data transmitted over an existing wireless connection 320 (e.g. Bluetooth) between mobile device 100 and wireless keyboard 310*a*, and alteration of the hardware of wireless keyboard 310*a* is unnecessary.

Figure 6B:
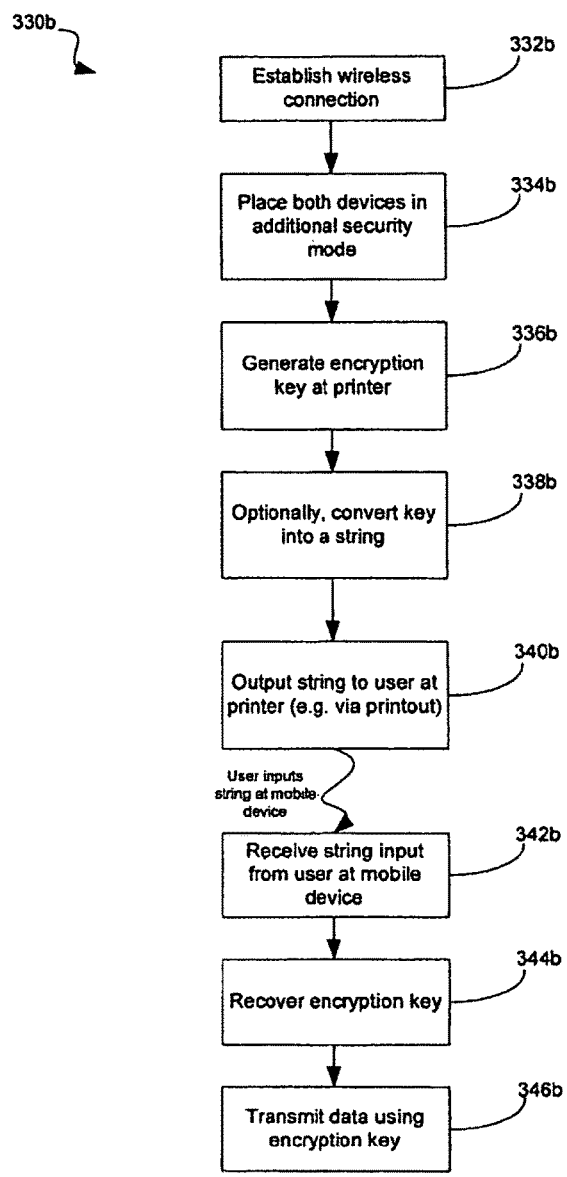
FIG. 6B is a flowchart illustrating steps of a method of exchanging an encryption key between the mobile device and the printer of the system shown in FIG. 6A.

Referring to FIG. 6B, a flowchart illustrating steps of a method of exchanging an encryption key between the mobile device and the printer of the system shown in FIG. 6A is shown generally as 330*b*. Steps 332*b* to 346*b* generally correspond to steps 332 to 346 as described with reference to FIG. 4B, except that the peripheral device is more specifically a peripheral output device such as wireless printer 310*b*. Accordingly, the reader is directed to the description provided herein with reference to FIGS. 4A and 4B for details in respect of method 330*b*.

In one embodiment, the encryption key is generated at wireless printer 310*b* (step 336*b*), which is converted to a string (step 338*b*). The string is then output to a user (step 340*b*) at wireless printer 310*b*. For example, the printer could simply print out the string for the user on paper or on another medium.

In operation, the user enters the string output at the printer 310*b* into mobile device 100. This may be done by entering the string through, for example, a keyboard (e.g. 116) integrated with mobile device 100, or through some other input device (e.g. touch screen) or user interface.

The string received at the mobile device (step 342*b*) is then used to recover the encryption key (step 344*b*). The encryption key can then be used to encrypt and decrypt data transmitted between mobile device 100 and wireless printer 310*b*, in accordance with a data encryption algorithm.

Accordingly, security can be added to data transmitted over an existing wireless connection 320 (e.g. Bluetooth) between mobile device 100 and wireless printer 310*b*, and alteration of the hardware of wireless printer 310*b* is unnecessary.

For example, Bluetooth-enabled printers usually have a fixed PIN associated with them. In atypical cases where it is possible to change a fixed PIN, desktop software or some other mechanism may be required to change the PIN. In contrast, in accordance with at least one embodiment, an encryption key can be generated every time a mobile device is paired with a wireless peripheral device. This provides for greater security, as the encryption key is not hard-coded in or otherwise fixedly associated with the peripheral device (or the mobile device), for example.

It will be understood by persons skilled in the art that although method 330*b* has been described herein with reference to a wireless printer 310*b*, in variant embodiments, the peripheral output device may be a device other than a wireless printer. The manner in which output is provided to the user at step 340*b* may be modified depending on the output capabilities of the particular peripheral output device.

It will be understood by persons skilled in the art that the term "keyboard" is not to be limited to devices that solely provide keyboard or keypad input capabilities. Similarly, the term "printer" is not to be limited to devices that solely provide printing capabilities. Some peripheral devices may provide multiple input and/or output capabilities. By way of example, a given device may be considered to be a "keyboard" in respect of embodiments described with reference to FIGS. 5A and 5B, while the same device may also be considered to be a "printer" in respect of embodiments described with reference to FIGS. 6A and 6B.

More generally, a peripheral output device is not restricted to peripheral output devices that solely provide output to a user. A peripheral device may be equipped with use input capabilities, but still considered to be an output device if it is capable of providing output to a user.

In embodiments of the invention where a string is to be output at one of the mobile device and the wireless peripheral device, and is subsequently input by the user at the other of the two devices, one of a number of algorithms may be employed to convert keys into a string format or to recover keys from a string.

Some examples of algorithms that may be employed include, for example, Public-Key Cryptography Standard #5 (PKCS5) using password-based key derivation function 2 (PBKDF2), and Simple Password-authenticated Exponential Key Exchange (SPEKE), or variants thereof. Some of these algorithms may not generate a string from an encryption key, but may instead be used to generate encryption keys from a string that is shared. The string to be shared may be derived from other data (e.g. a password, random data).

Accordingly, in a variant embodiment, this string rather than an actual encryption key may instead be first generated at one of the two devices. In that case, the encryption key generated at the one device (e.g. at step 336/336*a*/336*b*) is generated based on the string (which may have been derived from other data), using the appropriate string-to-key generation algorithm. In this manner, both devices will be able to generate the encryption key.

Figure 7:
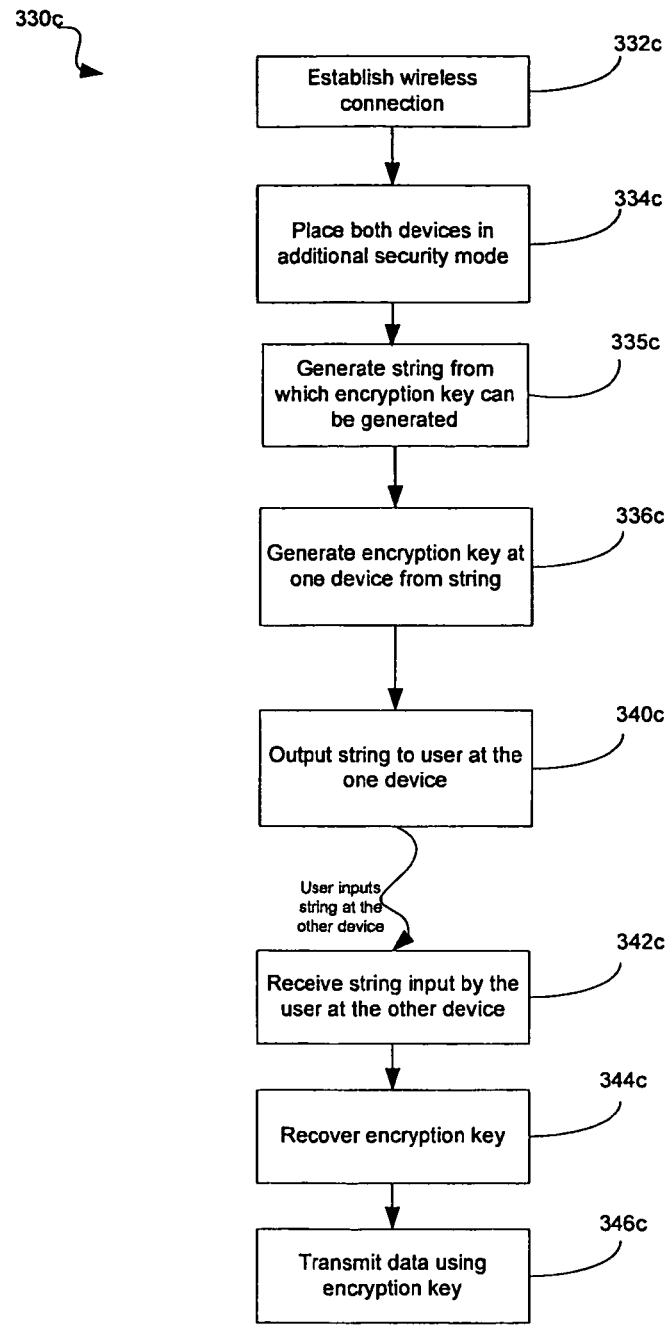
FIG. 7 is a flowchart illustrating steps of a method of exchanging an encryption key between the mobile device and the wireless peripheral device of the system shown in FIG. 4A, in a variant embodiment.

To illustrate this variant embodiment by way of example, reference is made to FIG. 7. Method 330*c* is similar to method 330 of FIG. 4B, except that the above-mentioned string is generated at step 335*c* (possibly derived from other data) and output at step 340*c* at the one device, to be received by the other device at step 342*c*. In another variant embodiment, the string generated at step 335*c* may be generated at a third device and provided to the one device.

The string generated at step 335*c* would also be used to generate the encryption key at the one device using the string-to-key generation algorithm at step 336*c*. Step 336*c* may be performed any time after step 335*c*, but before data is to be transmitted over the wireless connection at step 346*c*. Steps 332*c*, 334*c*, 344*c*, and 346*c* have been described with reference to steps 332, 334, 344, and 346 of method 330 of FIG. 4B respectively.

In view of the foregoing, it will be understood that the term "recover" and its derivations used herein in the specification and in the claims with reference to recovery of the encryption key (e.g. steps 344/344*a*/344*b*) is to be interpreted broadly, and may be, for example, interchangeable with the more general term "generate" and its respective derivations. In particular, the act of recovering an encryption key does not presuppose that the actual encryption key must first be generated at one device before it is recovered at the other device. For example, as noted above in respect of certain embodiments, an encryption key may be generated at each of two devices from the same, shared string. Accordingly, it is not necessary that an encryption key be first "generated" at one device in order that the encryption key may be "recovered" at the other device.

It will also be understood by persons skilled in the art that the order of the steps of the above methods may be modified in variant embodiments. For example, encryption keys may be exchanged between two devices in accordance with an embodiment of a method described herein before the pairing of two devices is initiated or before a wireless connection between the two devices is otherwise established. In the case where an encryption key is "pre-exchanged" in this manner and stored, the encryption key may be subsequently retrieved and automatically used to encrypt and decrypt data transmitted over a wireless connection once the wireless connection is established.

In variant embodiments of the invention, multiple keys may be generated and exchanged between two devices. For example, public and/or private keys may be exchanged between the two devices, and the data encryption algorithm to be employed in encrypting and decrypting data transmitted over the wireless connection may be based on public key cryptography.

Although the embodiments described herein make reference to a mobile device and a peripheral device, in variant embodiments, encryption keys may be exchanged between other computing devices and a peripheral device in the manner described herein.

The steps of a method of exchanging an encryption key between a computing device and a wireless peripheral device in embodiments described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of providing additional security over an established wireless connection between a computing device and a peripheral device, the method comprising:
   determining that a pairing process between the computing device and the peripheral device is complete;
   automatically, in response to completion of the pairing process, generating an encryption key at the computing device in a binary form;
   at the computing device, applying a conversion algorithm to the encryption key in the binary form to generate a number comprising fewer alphanumeric digits than the encryption key in the binary form, the conversion algorithm being associated with a recovery algorithm, wherein applying of the recovery algorithm to the number generates the encryption key in the binary form;
   at the computing device, displaying the number comprising fewer alphanumeric digits on a display of the computing device, for entry at the peripheral device; and
   at the computing device, encrypting data transmitted to or decrypting data received from the peripheral device over the wireless connection, using the encryption key and in accordance with an encryption algorithm.

2. The method of claim 1, wherein the pairing process is a Bluetooth pairing process.

3. The method of claim 1, wherein the encryption algorithm is a symmetric encryption algorithm.

4. The method of claim 1, wherein the number comprising fewer alphanumeric digits is a hexadecimal number.

5. The method of claim 1, further comprising generating a new encryption key at the computing device and repeating application of the conversion algorithm and the displaying in accordance with a schedule, without repeating the pairing process.

6. The method of claim 1, further comprising generating a new encryption key at the computing device and repeating application of the conversion algorithm and the displaying periodically, in accordance with a frequency, without repeating the pairing process.

7. The method of claim 1, further comprising generating a new encryption key at the computing device and repeating application of the conversion algorithm and the displaying in response to a user request, without repeating the pairing process.

8. The method of claim 1, wherein the computing device comprises a mobile device.

9. The method of claim 1, wherein the peripheral device comprises a keyboard.

10. A computing device configured to provide additional security over an established wireless connection between the computing device and a peripheral device, the computing device comprising:
  a processor and a memory, the processor being configured to:
    determine that a pairing process between the computing device and the peripheral device is complete;
    automatically, in response to completion of the pairing process, generate an encryption key at the computing device in a binary form;
    apply a conversion algorithm to the encryption key in the binary form to generate a number comprising fewer alphanumeric digits than the encryption key in the binary form, the conversion algorithm being associated with a recovery algorithm, wherein applying of the recovery algorithm to the number generates the encryption key in the binary form;
    display the number comprising fewer alphanumeric digits on a display of the computing device, for entry at the peripheral device; and
    encrypt data transmitted to or decrypt data received from the peripheral device over the wireless connection, using the encryption key and in accordance with an encryption algorithm.

11. A method of providing additional security over an established wireless connection between a computing device and a peripheral device, the method comprising:
  determining that a pairing process between the computing device and the peripheral device is complete;
  after determining that the pairing process is complete, receiving input via the peripheral device, wherein the input is a number comprising alphanumeric digits;
  at the peripheral device, applying a recovery algorithm to the number to generate an encryption key in binary form having more digits than the number, the recovery algorithm being associated with a conversion algorithm, wherein applying of the conversion algorithm to the encryption key in binary form generates the number; and
  at the peripheral device, encrypting data transmitted to or decrypting data received from the computing device over the wireless connection, using the encryption key and in accordance with an encryption algorithm.

12. The method of claim 11, wherein the pairing process is a Bluetooth pairing process.

13. The method of claim 11, wherein the encryption algorithm is a symmetric encryption algorithm.

14. The method of claim 11, wherein the number comprising alphanumeric digits is a hexadecimal number.

15. The method of claim 11, further comprising receiving new input at the peripheral device and repeating application of the recovery algorithm in accordance with a schedule, without repeating the pairing process.

16. The method of claim 11, further comprising receiving new input at the peripheral device and repeating application of the recovery algorithm periodically, in accordance with a frequency, without repeating the pairing process.

17. The method of claim 11, further comprising receiving new input at the peripheral device and repeating application of the recovery algorithm in response to a user request, without repeating the pairing process.

18. The method of claim 11, wherein the computing device comprises a mobile device.

19. The method of claim 11, wherein the peripheral device comprises a keyboard.

20. A peripheral device configured to provide additional security over an established wireless connection between a computing device and the peripheral device, the peripheral device comprising:
  a processor and a memory, the processor being configured to:
    determine that a pairing process between the computing device and the peripheral device is complete;
    after determining that the pairing process is complete, receive input via the peripheral device, wherein the input is a number comprising alphanumeric digits;
    apply a recovery algorithm to the number to generate an encryption key in binary form having more digits than the number, the recovery algorithm being associated with a conversion algorithm, wherein applying the conversion algorithm to the encryption key in binary form generates the number; and
    encrypt data transmitted to or decrypt data received from the computing device over the wireless connection, using the encryption key and in accordance with an encryption algorithm.

21. A non-transitory computer-readable medium comprising computer-executable instructions which, when executed by a processor of a computing device to provide additional security over an established wireless connection between the computer device and a peripheral device, cause the computing device to:
  determine that a pairing process between the computing device and the peripheral device is complete;
  automatically, in response to completion of the pairing process, generate an encryption key at the computing device in a binary form;
  apply a conversion algorithm to the encryption key in the binary form to generate a number comprising fewer alphanumeric digits than the encryption key in the binary form, the conversion algorithm being associated with a recovery algorithm, wherein applying the recovery algorithm to the number generates the encryption key in the binary form;
  display the number comprising fewer alphanumeric digits on a display of the computing device, for entry at the peripheral device; and
  encrypt data transmitted to or decrypt data received from the peripheral device over the wireless connection, using the encryption key and in accordance with an encryption algorithm.

22. The non-transitory computer-readable medium of claim 21, wherein the pairing process is a Bluetooth pairing process.

23. The non-transitory computer-readable medium of claim 21, wherein the encryption algorithm is a symmetric encryption algorithm.

24. The non-transitory computer-readable medium of claim 21, wherein the number comprising fewer alphanumeric digits is a hexadecimal number.

25. The non-transitory computer-readable medium of claim 21, wherein the computer-executable instructions, when executed by the processor, further cause the computing device to generate a new encryption key and to repeat application of the conversion algorithm and displaying of the number in accordance with a schedule, without repeating the pairing process.

26. The non-transitory computer-readable medium of claim 21, wherein the computer-executable instructions, when executed by the processor, further cause the computing device to generate a new encryption key and to repeat application of the conversion algorithm and displaying of the number periodically, in accordance with a frequency, without repeating the pairing process.

27. The non-transitory computer-readable medium of claim 21, wherein the computer-executable instructions, when executed by the processor, further cause the computing device to generate a new encryption key and to repeating application of the conversion algorithm and displaying of the number in response to a user request, without repeating the pairing process.

28. The non-transitory computer-readable medium of claim 21, wherein the computing device comprises a mobile device.

29. The non-transitory computer-readable medium of claim 21, wherein the peripheral device comprises a keyboard.

30. A non-transitory computer-readable medium comprising computer-executable instructions which, when executed by a processor of a peripheral device to provide additional security over an established wireless connection between a computing device and the peripheral device, cause the peripheral device to:
  determine that a pairing process between the computing device and the peripheral device is complete;
  after determining that the pairing process is complete, receive input via the peripheral device, wherein the input is a number comprising alphanumeric digits;
  apply a recovery algorithm to the number to generate an encryption key in binary form having more digits than the number, the recovery algorithm being associated with a conversion algorithm, wherein applying the conversion algorithm to the encryption key in binary form generates the number; and
  encrypt data transmitted to or decrypt data received from the computing device over the wireless connection, using the encryption key and in accordance with an encryption algorithm.

31. The non-transitory computer-readable medium of claim 30, wherein the pairing process is a Bluetooth pairing process.

32. The non-transitory computer-readable medium of claim 30, wherein the encryption algorithm is a symmetric encryption algorithm.

33. The non-transitory computer-readable medium of claim 30, wherein the number comprising alphanumeric digits is a hexadecimal number.

34. The non-transitory computer-readable medium of claim 30, wherein the computer-executable instructions, when executed by the processor, further cause the peripheral device to receive new input at the peripheral device and to repeat application of the recovery algorithm in accordance with a schedule, without repeating the pairing process.

35. The non-transitory computer-readable medium of claim 30, wherein the computer-executable instructions, when executed by the processor, further cause the peripheral device to receive new input and to repeat application of the recovery algorithm periodically, in accordance with a frequency, without repeating the pairing process.

36. The non-transitory computer-readable medium of claim 30, wherein the computer-executable instructions, when executed by the processor, further cause the peripheral device to receive new input and to repeat application of the recovery algorithm in response to a user request, without repeating the pairing process.

37. The non-transitory computer-readable medium of claim 30, wherein the computing device comprises a mobile device.

38. The non-transitory computer-readable medium of claim 30, wherein the peripheral device comprises a keyboard.

* * * * *